000 3,450,731
Patented June 17, 1969

3,450,731
PROCESS FOR THE PREPARATION OF PHENYLMERCURIC SALTS
Charles J. Conner, New Orleans, La., assignor to the United States of America as represented by the Secretary of Agriculture
No Drawing. Filed Sept. 1, 1967, Ser. No. 665,695
Int. Cl. C07f 3/12, 11/00, 15/02
U.S. Cl. 260—429 14 Claims

ABSTRACT OF THE DISCLOSURE

This invention relates to the preparation of phenylmercuric salts. More particularly, this invention relates to the precipitation of phenylmercuric salts with aqueous sodium or potassium salts. Still more particularly, this invention relates to a reaction between a triethanolammonium phenylmercuric salt complex and aqueous sodium or potassium salts of various inorganic and organic acids.

---

A non-exclusive, irrevocable, royalty-free license in the invention herein described throughout the world for all purposes of the United States Government, with the power to grant sublicenses for such purposes, is hereby granted to the Government of the United States of America.

A primary object of this invention is to prepare at will some phenylmercuric salts. A further object of this invention is to prepare these salts by an anion exchange between triethanolammonium phenylmercuric salt complexes and aqueous sodium or potassium salts. A still further object of this invention is to prepare these salts more efficiently and with a greater yield.

This invention relates to a process whereby water solubilized phenylmercuric salts with triethanolamine, regarded as triethanolammonium phenylmercuric salt complexes (U.S. Patents 2,524,547, 2,411,815, and 2,423,121), can be precipitated with aqueous sodium or potassium salts of various inorganic and organic acids to form new phenylmercuric salts of the anion of the sodium or potassium salt.

Several soluble sodium salts, ferrocyanide, tungstate, and chloride, in aqueous solution, were added to triethanolammonium phenylmercuric acetate complex solution in water. Insoluble phenylmercuric ferrocyanide, tungstate, and chloride were obtained. These compounds were identified and found to be the phenylmercuric salt of the sodium salt anion. The following illustration shows a typical reaction of this invention:

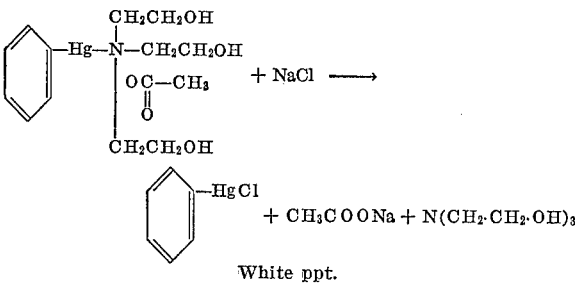

White ppt.

The white precipitate of phenylmercuric chloride is filtered, washed with distilled water until free of soluble chloride ion, dried and weighed. The yield of phenylmercuric chloride was found to be 95%. The $\phi$Hg chloride salt was fused with NaOH, diluted with distilled water, neutralized with dilute sulfuric acid and titrated with silver nitrate using sodium chromate as an indicator. Mercury was determined by digestion with sulfuric and nitric acid and precipitation of the mercury as mercuric sulfide.

This novel method for preparing phenylmercuric salts has resulted in the preparation of several odd and unreported phenylmercurials which are of interest in the fungicidal field and wherever else phenylmercurials have utility. In addition to the above-mentoned phenylmercuric chloride, phenylmercuric ferrocyanide, tungstate, molybdate, ortho vanadate and chromate have also been prepared by the process of this invention. Each of these compounds was prepared by adding an aqueous solution of sodium ferrocyanide, sodium tungstate, sodium molybdate, sodium ortho vanadate, or sodium chromate to an aqueous solution of triethylammonium phenylmercuric acetate or lactate. The phenylmercuric salt of the anion of the sodium salt was precipitated, filtered, washed several times with distilled water to remove soluble residuals, and oven dried of 100° C. Yields were determined and cations and anions determined by qualitative analysis and X-ray fluorescence.

The utility of phenylmercuric compounds as germicides, fungicides, and preservatives in such items as toothbrush bristles, textile fabrics, salves for skin disorders (Ungentine Cream) etc. are well known and are in use at present in numerous commercial products. The protective fungicidal and germicidal action results from the presence of the phenylmercuric ion which has been demonstrated to be more or less effective when combined with certain anions such as chloride, lactate, acetate and propionate [U.S. Patent 3,291,635 and Conner, C. J.; Cooper, A. S.; Reeves, W. A.; and Trask, B. A.; Textile Research Journal, 34, 347 (1964)]. This invention discloses a new process for the preparation of phenylmercuric salts, several of which are novel and not known to be commercially available. Since phenylmercuric salts have been used in dermatitis treatment creams and toothbrush bristles, the utility of these compounds has been demonstrated commercially. Furthermore, the combination of phenylmercuric salts with zirconium to produce water soluble textile fungicides has been previously demonstrated to have commercial utility. Also, various phenylmercury salts prepared by this process are capable of producing zirconium complexes for fungicidal treatments, or by solubilization in organic amines and ammonium compounds for aqueous fungicidal applications (U.S. Patents 2,524,547; 2,411,815; and 2,423,121). The process also demonstrates utility in application when a fabric is wetted with an aqueous triethanolammonium solution of phenylmercuric acetate or lactate followed by wetting with the sodium salt of a particular anion (chloride, chromate, vanadate, etc.) in water to precipitate in situ a deposit of the respective phenylmercuric salt of that particular anion. This is useful in textile fungicidal treatments where aqueous solutions demonstrate low cost and ease of application of fungicide through aqueous double decomposition. In every instance where a phenylmercuric salt is used as a fungicide or germicide, the activity is demonstrated better than on untreated cotton without fungicide or germicide, showing all phenylmercuric salts to be active and having utility in these fields.

The following examples illustrate the process of this invention. All percentages shown are on a weight basis.

Example 1

100 g. of triethanolammonium phenylmercuric lactate solution containing 16.5% mercury was prepared by mixing 30 g. of phenylmercuric lactate crystals together with 35 g. of triethanolamine and then slowly adding 35 g. of distilled water and stirring to produce a clear solutlon.

Example 2

100 g. of triethanolammonnium phenylmercuric acetate containing 17.8% mercury was prepared by mixing 30 g.

of phenylmercuric acetate crystals together with 35 g. of triethanolamine and then slowly adding 35 g. of distilled water and stirring to produce a clear solution.

Example 3

Equal parts by volume of a 5% aqueous solution of sodium molybdate and triethanolammonium phenylmercuric acetate, containing 17.8% mercury, were mixed together. The white precipitate formed was washed, dried, and identified through the presence of mercury and molybdenum by X-ray and qualitative analysis.

Example 4

Equal parts by volume of a 5% aqueous solution of sodium tungstate and triethanolammonium phenylmercuric acetate containing 17.8% mercury were mixed together. The white precipitate formed was washed, dried, and identified through the presence of mercury and tungsten by X-ray and qualitative analysis.

Example 5

Equal parts by volume of a 5% aqueous solution of sodium vanadate and triethanolammonium phenylmercuric acetate containing 17.8% mercury were mixed together. The white precipitate formed was washed, dried, and identified through the presence of mercury and vanadium by X-ray and qualitative analysis.

Example 6

Equal parts by volume of a 5% aqueous solution of sodium chloride and triethanolammonium phenylmercuric acetate containing 17.8% mercury were mixed together. The white precipitate formed was washed, dried, and identified through the presence of mercury and chlorine by X-ray and qualitative analysis.

Example 7

Equal parts by volume of a 5% aqueous solution of sodium ferrocyanide and triethanolammonium phenylmercuric acetate containing 17.8% mercury were mixed together. The white precipitate formed was washed, dried, and identified through the presence of mercury and ferrocyanide by X-ray and qualitative analysis.

Example 8

Equal parts by volume of a 5% aqueous solution of sodium chromate and triethanolammonium phenylmercuric acetate, containing 17.8% mercury, were mixed together. The yellow precipitate formed was washed, dried, and identified through the presence of mercury and chromium by X-ray and qualitative analysis. The phenylmercuric chromate was dissolved in zirconylammonium carbonate solution to give a 0.4% mercury and 0.06% chromium and 3.05% $ZrO_2$ add-on. The treated duck and a control (untreated) were placed in a soil bed. After 5 weeks, the treated duck had 100% retained strength while the untreated duck rotted out in 2 weeks.

Example 9

Equal parts by volume of a 5% aqueous solution of sodium molybdate and triethanolammonium phenylmercuric lactate containing 16.5% mercury were mixed together. The white precipitate formed was washed, dried, and identified through the presence of mercury and molybdenum by X-ray and qualitative analysis. The phenylmercuric molybdate was solubilized to 0.5% molybdenum and 0.8% mercury in zirconyl carbonate and applied to duck to give 0.44% mercury and 0.24% molybdenum. The treated duck and an untreated one were buried in a soil bed. After 5 weeks the treated duck had 99.3% retained strength while the untreated duct rotted out after 2 weeks.

Example 10

Equal parts by volume of a 5% aqueous solution of sodium tungstate and triethanolammonium phenylmercuric lactate, containing 16.5% mercury, were mixed together. The white precipitate formed was washed, dried, and identified through the presence of mercury and tungsten by X-ray and qualitative analysis.

Example 11

Equal parts by volume of a 5% aqueous solution of sodium vanadate and triethanolammonium phenylmercuric lactate, containing 16.5% mercury, were mixed together. The white precipitate formed was washed, dried, and identified through the presence of mercury and vanadium by X-ray and qualitative analysis.

Example 12

Equal parts by volume of a 5% aqueous solution of sodium chloride and triethanolammonium phenylmercuric lactate containing 16.5% mercury were mixed together. The white precipitate formed was washed, dried, and identified through the presence of mercury and chlorine by X-ray and qualitative analysis.

Example 13

Equal parts by volume of a 5% aqueous solution of sodium ferrocyanide and triethanolammonium phenylmercuric lactate containing 16.5% mercury were mixed together. The white precipitate formed was washed, dried, and identified through the presence of mercury and ferrocyanide by X-ray and qualitative analysis.

Example 14

Equal parts by volume of a 5% aqueous solution of sodium chromate and triethanolammonium phenylmercuric lactate containing 16.5% mercury were mixed together. The yellow precipitate formed was washed, dried, and identified through the presence of mercury and chromium by X-ray and qualitative analysis.

Example 15

25 ml. of a 5% aqueous sodium ferrocyanide solution and 25 ml. of triethanolammonium phenylmercuric acetate solution, containing 17.8% mercury, were mixed together and produced a gray-white precipitate of phenylmercuric ferrocyanide. The precipitate was filtered, washed free of solubles, and retained for fungicidal solubilization in zirconyl ammonium carbonate.

The dried phenylmercuric ferrocyanide was dissolved in a solution of zirconyl ammonium carbonate (10% $ZrO_2$) to give 0.5% mercury in solution. A scoured duck was treated with this solution to give a 0.16% add-on of mercury after curing at 140° C. for 3 minutes. The treated duck and an untreated duck were buried in the soil (rot) bed. The treated sample showed 98.5% retained breaking strength after 4 weeks while the untreated duck rotted out at the end of the 1st week.

Example 16

53.8 g. of sodium vanadate were dissolved in 250 ml. of distilled water and further diluted to 300 ml. with distilled water. 115.1 g. of phenylmercuric acetate were solubilized in 135 g. of triethanolamine and 165 g. of distilled water to produce approximately 300 ml. of clear triethanolammonium phenylmercuric acetate complex. The vanadate solution was slowly poured into the complex solution while stirring vigorously. The phenylmercuric vanadate was precipitated as a white powder. The precipitate was allowed to settle, was filtered, and washed five times with distilled water. The filter cake was dried to a constant weight at 50° C. A yield of 92.8 g. of vanadate was obtained, which was 86% of theory. X-ray fluorescence analysis showed 5.19% vanadium and 62.5% mercury, by weight. On ignition, the mercury is driven off and $V_2O_5$ remains as an ash which was identified by X-ray fluorescence.

Example 17

100 g. of triethanolammonium phenylmercuric lactate solution, prepared from 30 g. of phenylmercuric lactate crystals, 35 g. triethanolamine and 35 G. distilled water, were mixed with 13.2 g. of sodium tungstate in 150 ml. distilled water. A white precipitate of phenylmercuric tungstate was precipitated, filtered, washed with distilled water, and oven dried at 50° C. The residue was weighed and the yield was 90% of theory.

I claim:
1. A process for preparing a phenylmercuric salt consisting of
   (a) reacting about 1 part of a 5% solution of a sodium salt selected from the group consisting of sodium chloride, sodium vanadate, sodium chromate, sodium ferrocyanide, sodium molybdate, and sodium tungstate, with about 1 part of a solution of triethanolammonium phenylmercuric acetate containing about 17.8% mercury,
   (b) separating the resulting phenyl-mercuric salt from the reaction mixture, and
   (c) washing the phenylmercuric salt free of excess reagents.
2. The process of claim 1 wherein the sodium salt is sodium chloride.
3. The process of claim 1 wherein the sodium salt is sodium vanadate.
4. The process of claim 1 wherein the sodium salt is sodium chromate.
5. The process of claim 1 wherein the sodium salt is sodium ferrocyanide.
6. The process of claim 1 wherein the sodium salt is sodium molybdate.
7. The process of claim 1 wherein the sodium salt is sodium tungstate.
8. A process for preparing a phenylmercuric salt consisting of
   (a) reacting about 1 part of a 5% solution of a sodium salt selected from the group consisting of sodium chloride, sodium vanadate, sodium chromate, sodium ferrocyanide, sodium molybdate and sodium tungstate, with about 1 part of a solution of triethanolammonium phenylmercuric lactate containing about 16.5% mercury,
   (b) separating the resulting phenyl-mercuric salt from the reaction mixture, and
   (c) washing the phenylmercuric salt free of excess reagents.
9. The process of claim 8 wherein the sodium salt is sodium chloride.
10. The process of claim 8 wherein the sodium salt is sodium vanadate.
11. The process of claim 8 wherein the sodium salt is sodium chromate.
12. The process of claim 8 wherein the sodium salt is sodium ferrocyanide.
13. The process of claim 8 wherein the sodium salt is sodium molybdate.
14. The process of claim 8 wherein the sodium salt is sodium tungstate.

References Cited

UNITED STATES PATENTS

| | | | |
|---|---|---|---|
| 1,787,630 | 1/1931 | Kharasch | 260—433 |
| 2,059,196 | 11/1936 | Andersen | 260—432 |
| 2,196,384 | 4/1940 | Christiansen | 260—433 |
| 2,423,262 | 7/1947 | Sowa | 260—434 |
| 3,291,635 | 12/1966 | Conner. | |

OTHER REFERENCES

Whitmore, Org. Compounds of Mercury, Chemical Catalog Company, Inc., New York (1921), pp. 182–183.

TOBIAS E. LEVOW, *Primary Examiner.*

H. M. S. SNEED, *Assistant Examiner.*

U.S. Cl. X.R.

260—432, 433